No. 649,699. Patented May 15, 1900.
C. W. LARSON.
SYSTEM OF MOTOR CONTROL.
(Application filed Mar. 30, 1900.)

(No Model.)

Witnesses:
Lewis T. Abell.
Alex F. Macdonald,

Inventor:
Carl W. Larson.
by Albert G. Davis
Atty.

UNITED STATES PATENT OFFICE.

CARL W. LARSON, OF SCHENECTADY, NEW YORK, ASSIGNOR TO THE GENERAL ELECTRIC COMPANY, OF NEW YORK.

SYSTEM OF MOTOR CONTROL.

SPECIFICATION forming part of Letters Patent No. 649,699, dated May 15, 1900.

Application filed March 30, 1900. Serial No. 10,723. (No model.)

*To all whom it may concern:*

Be it known that I, CARL W. LARSON, a citizen of the United States, residing at Schenectady, county of Schenectady, State of New York, have invented certain new and useful Improvements in Systems of Motor Control, (Case No. 1243,) of which the following is a specification.

My invention relates to a system of motor control, and has for its object to provide a simple and effective means for so controlling the circuit connections between the motor and its source of supply that the said circuit will be opened whenever a device operated by the motor reaches a certain definite position in its movement.

I have illustrated my invention in connection with a drawbridge, although it is equally applicable in connection with any movable device that requires a positive support in one of its operative positions. In drawbridges as at present contructed it is necessary that some means should be provided for supporting the free end of the draw when it is in its closed position, so as to prevent vibration of the same as heavy loads are carried over it, and in heavy structures this supporting means generally comprises a heavy mechanism operated by some type of motive device. In operating the draw it is therefore necessary, before setting into operation the means for turning the drawbridge on its pivot or withdrawing it from proximity to the end of the bridge, to first set in operation a motive device for withdrawing the support under the free end of the draw and when such support has been sufficiently withdrawn to stop said motive device. After this support has been withdrawn power may be supplied to the main motive device for opening the draw. Similarly after the draw has been closed it is necessary to set in operation the motive device for replacing the support, and the operator must be careful to shut off the power from this motive device when the support has been replaced. By my invention I provide means for bringing to rest the motor actuating the support whenever the said support reaches either extreme of its movement, no attention on the part of the operator being required except to start the motor into operation.

Figure 1:
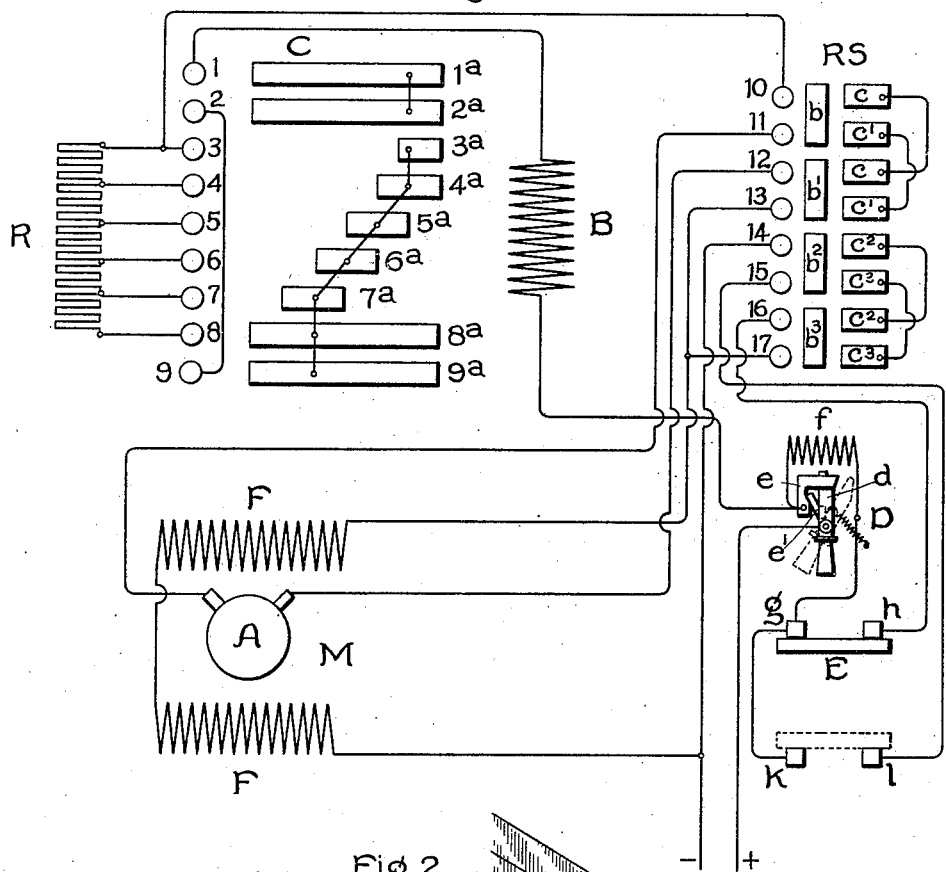
Figure 2:
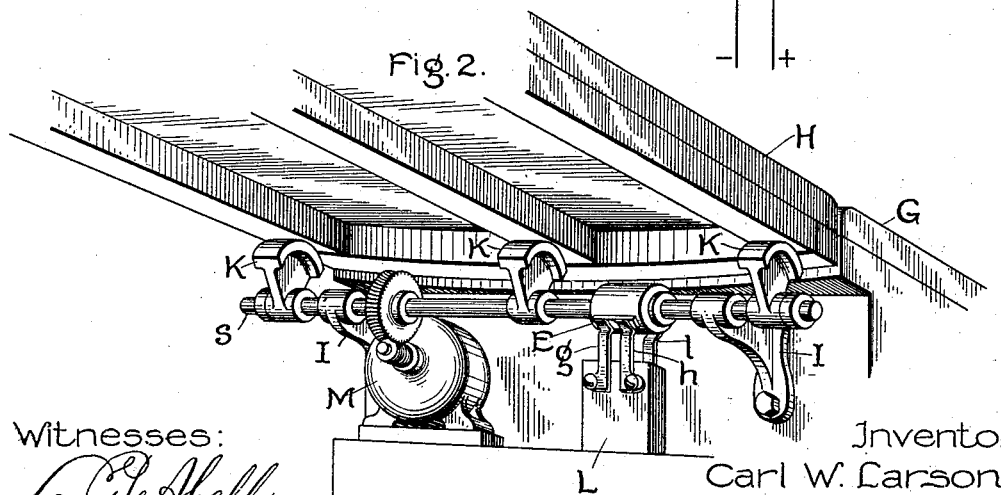

Referring to the drawings accompanying this specification, Figure 1 illustrates, diagrammatically, the controlling-switches and circuit connections arranged according to my invention; and Fig. 2 illustrates an application of my invention to a drawbridge.

Referring to Fig. 2, G represents a portion of a bridge adjacent to the end of the draw, and H represents the drawbridge itself, which may evidently be of any desired type, either sliding or swinging. Beneath the end of the draw and mounted on an abutment at the end of the bridge are supports I I, carrying bearings in which is mounted a shaft s, this shaft carrying a plurality of eccentrics K, which engage with proper bearing-surfaces (not shown) on the timbers of the drawbridge and constitute a support therefor. The shaft s is operated by means of a motor M, geared thereto by means of a worm-gear. The shaft carries also, mounted on an insulating-support, a conducting-strip E, arranged to bridge the contacts $g\ h$ or the contacts $k\ l$, which latter are mounted upon an insulating-support L, according as the shaft s is in one or the other of its extreme positions. In the position of parts illustrated in Fig. 2 of the drawings the eccentrics K are in position to support the draw and the conducting-strip E is in position to bridge the contacts $g\ h$. When the shaft s is in such a position that the eccentrics K no longer rest against the lower side of the draw, the contact-strip E will bridge the contacts $k\ l$.

I have shown in Fig. 1 the switching device and circuit connections that are required to operate the supports K in the manner already described. Referring now to Fig. 1, A indicates the armature of the motor M, and F F its field-windings. C indicates the main controller, by means of which the motor M is controlled in its operation. RS indicates the reversing-switch for changing the relative connections of the armature and field windings of the motor. D indicates the circuit-breaker, which may be of any suitable construction, but which is provided with a high-resistance actuating-coil adapted to be connected in shunt to the mains. E indicates the bridging-contact, already referred to, which operates to connect the actuating-coil of the circuit-breaker D across a source of current-supply in the extreme positions of the shaft s in a manner to be hereinafter more fully described. The controller C and reversing-switch RS comprise fixed contacts (indicated by the small circles) and movable contacts, (indicated by the rectangles,) all the contacts being shown developed on a plane surface, as is customary in illustrating such structures, although in actual construction the movable contacts are commonly mounted upon the surface of the cylinder and are successively brought into engagement with the fixed contacts as the cylinder is actuated. The circuit-breaker D may be of any desired construction, but I preferably use the form described in Patent No. 567,137 to E. M. Hewlett, the only difference being that I provide the circuit-breaker with an actuating-coil having high resistance and adapted to be connected in shunt to a circuit instead of a low-resistance series coil, as is shown in said patent.

Assuming the parts to be in the position shown in Fig. 2, with the contact-strip E bridging the contacts $g$ and $h$, if it is desired to operate the motor M to move the supports K the reversing-switch RS will be moved until the contacts $b\,b'$ are in engagement with the corresponding fixed contacts 10 to 13, inclusive, and the controller C will then be moved until in its first position the movable contacts $1^a$, $2^a$, $8^a$, and $9^a$ are brought into engagement with the corresponding fixed contacts. In this position of the controller the circuit connections may be traced as follows: Starting from the plus main the circuit leads through the movable switch member $d$ of the circuit-breaker D to the fixed members $e\,e'$, thence through the blow-out coil B of the controller C to fixed contact 1, by way of cross-connected contacts $1^a\,2^a$ to fixed contact 2, by way of cross connection to fixed contact 9, through cross-connected contacts $9^a$ and $8^a$ to fixed contact 8, thence through resistance R to fixed contact 10 of the reversing-switch, by way of contact $b$ to fixed contact 11, through the armature A of the motor M to fixed contact 12 on the reversing-switch, and by way of contact $b'$ to fixed contact 13, and through the sections F F of the field-windings of the motor to the minus main. In this position of the switches a circuit may also be traced from the positive main through the movable switch member $d$ of the circuit-breaker D and through the fixed members $e$ $e'$ to the actuating-coil $f$ of the said circuit-breaker, through contacts $g$ and $h$, by way of the bridging-conductor E to the fixed contact 16 on the reversing-switch, by way of movable contact $b^3$ to fixed contact 17, at which point this circuit joins the circuit already traced, the actuating-coil of the circuit-breaker being thus connected in shunt to the armature of the motor M. As will be seen by referring to the construction shown in the patent to E. M. Hewlett above referred to, the actuating-coil $f$ operates to withdraw a detent normally in engagement with a projection on the spring-actuated switch-lever $d$, so that until the actuating-coil is sufficiently energized the switch-lever is maintained in the position shown in the drawings. When the actuating-coil $f$ is shunted around the armature of the motor M, as is the case when the motor is started into operation, the current flowing through the actuating-coil $f$ is insufficient to withdraw the detent from the switch-lever $d$, and the circuit-breaker therefore remains closed in the position shown in the drawings. As the controller C is moved to its final position the sections of resistance R are gradually cut out in a manner well understood and the motor M is caused to operate at full speed to rotate the shaft $s$ and to remove the supports K. As soon as the motor has started into operation the bridging-contact E will be withdrawn from the contacts $g\,h$ and the motor will continue to run until the said contact bridges the contacts $k\,l$. When this occurs, a circuit will be closed through the actuating-coil of the circuit-breaker, as follows: starting from the plus main, through the switch members of the circuit-breaker to the actuating-coil $f$, through the contacts $k$ and $l$, by way of the bridging device E to fixed contact 15 on the reversing-switch, and by way of movable contact $b^2$ to contact 14 and back to the minus main. The actuating-coil of the circuit-breaker will therefore be supplied with the full potential of the system and will operate to withdraw the detent from engagement with the spring-actuated lever $d$, and the said lever will be thrown into the position shown in dotted lines, thereby opening the main circuit to the motor M and causing the same to come to rest. If now the controller C is thrown to its off position and the reversing-switch RS thrown so as to bring its contacts $c$ and $c'$ into engagement with the contacts 10 to 13, inclusive, the circuit-breaker may be closed and the system will be in condition when again the controller C is thrown into operation to drive the motor M in such a direction as to replace the supports K in their operative position. With the reversing-switch in this position, with its contacts $c$ and $c'$ engaging the fixed contacts 10 to 13, the connections for the motor-circuit will be the same as those already described, except that the relative direction of current-flow in the armature and field windings of the motor will be reversed, and, as before, a branch circuit may be traced through the actuating-coil of the circuit-breaker in shunt to the armature of the motor. The energizing-coil of the circuit-breaker will not, however, be supplied with full potential until the contact E has been again brought into engagement with the contacts $g$ and $h$, at which time a circuit will be closed from the plus main through the switch members of the circuit-breaker, and through the actuating-coil of the circuit-breaker through the contacts $g$ $h$, by way of bridging-contact E to fixed contact 16 on the reversing-switch, and by way of cross-connected movable contact $c^2$ to fixed contact 14 and the minus main, when the circuit-breaker D will be opened, as before. It will be noted that although the fixed contacts 14 to 17, inclusive, and movable contacts $b^2$, $b^3$, $c^2$, and $c^3$ are shown associated with the contacts on the reversing-switch they form no part of the same and might, if desired, be mounted on a separate structure. These contacts control only the circuit connections of the contacts $h$ and $l$; but since it is necessary that they should be actuated at the same time the contacts of the reversing-switch are actuated they are preferably combined in the same structure with the reversing-switch.

I have shown the two sets of contacts cooperating with the bridging device E as comprising each two contacts; but it is evident that the contacts $g$ and $h$ might be omitted, if desired, in which case the terminal of the actuating-coil $f$ would be connected directly to the bridging device E. Other modifications in details may evidently be made without departing from the spirit of my invention, and all such modifications I intend to include in the scope of the following claims.

What I claim as new, and desire to secure by Letters Patent of the United States, is—

1. In combination, a movable body, a device to be moved constituting a support therefor, a motive device for moving said support into engagement with and for withdrawing it from said body, and means controlled by the movement of said support in either direction for stopping said motive device.

2. In combination, a movable body, a device to be moved constituting a support therefor, a motor for operating said device, a circuit-breaker in the circuit of said motor, an actuating-coil therefor, and means controlled by the movement of said support, for energizing said actuating-coil.

3. In combination, a movable body, a device to be moved constituting a support therefor, a motor for operating said device, a circuit-breaker in the circuit of said motor, an actuating-coil therefor, a plurality of contacts, means in operative relation to said device for closing a circuit from one side of a source of supply through said actuating-coil to one or the other of said contacts, and a switch for connecting one or the other of said contacts to the other side of said source.

4. In combination, a device to be moved, a motor for operating said device, a circuit-breaker, an actuating-coil therefor, two sets of contacts, means in operative relation to said device for bridging either of said sets of contacts, and a switch for operatively connecting said actuating-coil to a source of current-supply through one or the other of said sets of contacts.

5. In combination, a device to be moved, a motor for operating said device, a source of current-supply, a circuit-breaker, an actuating-winding therefor, two sets of contacts, means carried by said device for bridging one or the other of said sets of contacts, a reversing-switch in said motor-circuit, and contacts carried by said reversing-switch for connecting the actuating-winding of the circuit-breaker across the source through one or the other of said sets of contacts.

6. In combination, a device to be moved, a motor for operating said device, a circuit-breaker in the circuit of said motor, an actuating-coil therefor, two sets of fixed contacts, a connection from one terminal of said actuating-coil to one side of a source of current-supply, a connection from the other terminal of said coil to a contact in each of said sets of fixed contacts, means for connecting the remaining contact of either set to the other side of said source, and means actuated by the device to be moved for bridging the contacts of either of said sets.

7. In combination, a device to be moved, a motor for operating said device, a circuit-breaker in the circuit of said motor, an actuating-coil therefor, two sets of fixed contacts, a connection from one terminal of said actuating-coil to one side of a source of current-supply, a connection from the other terminal of said coil to a contact in each of said sets of fixed contacts, a reversing-switch in said motor-circuit, contacts carried by said reversing-switch for connecting the remaining contact of either of said sets of fixed contacts to the other side of said source, and means actuated by the device to be moved, for bridging said contacts.

8. In combination, a device to be moved, a motor for operating said device, a circuit-breaker in the circuit of said motor, an actuating-coil therefor, two sets of fixed contacts, a connection from one terminal of said actuating-coil to one side of a source of current-supply, a connection from the other terminal of said coil to a contact in each of said sets of fixed contacts, a reversing-switch in said motor-circuit, means operated simultaneously therewith for connecting the remaining contact of either of said sets of fixed contacts to the other side of said source, and means actuated by the device to be moved, for bridging said contacts.

In witness whereof I have hereunto set my hand this 28th day of March, 1900.

CARL W. LARSON.

Witnesses:
BENJAMIN B. HULL,
ALEX F. MACDONALD.